United States Patent [19]
Michaelis et al.

[11] Patent Number: 6,031,614
[45] Date of Patent: Feb. 29, 2000

[54] MEASUREMENT SYSTEM AND METHOD FOR MEASURING CRITICAL DIMENSIONS USING ELLIPSOMETRY

[75] Inventors: Alexander Michaelis; Oliver Genz, both of Wappingers Falls; Ulrich Mantz, Poughkeepsie, all of N.Y.

[73] Assignee: Siemens Aktiengesellschaft, Munich, Germany

[21] Appl. No.: 09/204,402

[22] Filed: Dec. 2, 1998

[51] Int. Cl.[7] ..................................................... G01J 4/00
[52] U.S. Cl. ........................... 356/369; 356/368; 356/445
[58] Field of Search ..................................... 356/365, 244, 356/326, 300, 445, 369, 364, 367; 359/483

[56] References Cited

U.S. PATENT DOCUMENTS 5,548,404  8/1996  Kupershmidt et al. .................. 356/368
5,963,327  10/1999 He et al. .................................. 356/369

Primary Examiner—Frank G. Font
Assistant Examiner—Delma R. Flores Ruiz
Attorney, Agent, or Firm—Donald B. Paschburg

[57] ABSTRACT

A system for measuring surface features having form birefringence in accordance with the present invention includes a radiation source for providing radiation incident on a surface having surface features. A radiation detecting device is provided for measuring characteristics of the incident radiation after being reflected from the surface features. A rotating stage rotates the surface such that incident light is directed at different angles due to the rotation of the rotating stage. A processor is included for processing the measured characteristics of the reflected light and correlating the characteristics to measure the surface features. A method for measuring feature sizes having form birefringence, in accordance with the present invention includes the steps of providing a surface having surface features thereon, radiating the surface features with light having a first polarization, measuring a reflected polarization of light reflected from the surface features, rotating the surface features by rotating the surface to measure the reflected polarization of the reflected light at least one new rotated position and correlating the reflected polarization to surface feature sizes.

49 Claims, 9 Drawing Sheets

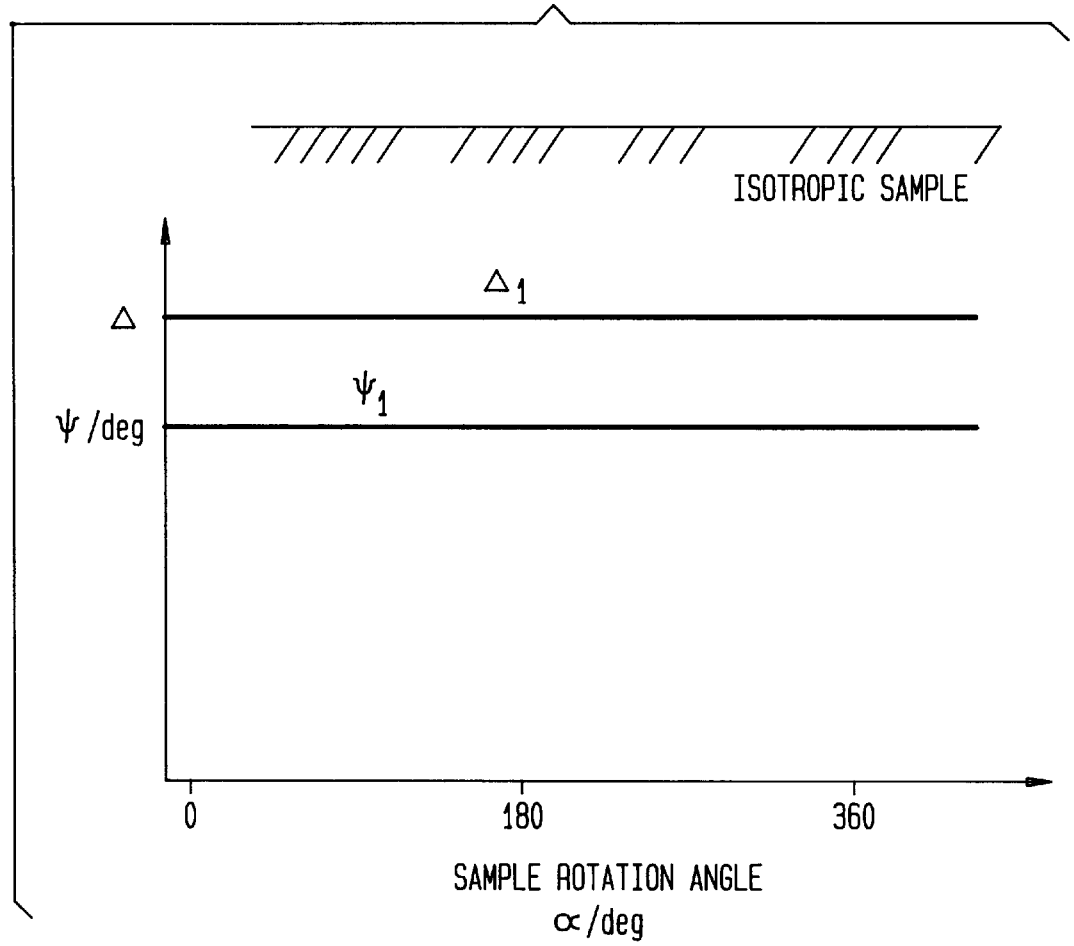

MEASUREMENT SYSTEM AND METHOD FOR MEASURING CRITICAL DIMENSIONS USING ELLIPSOMETRY

BACKGROUND

1. Technical Field

This disclosure relates to measurements systems and methods and more particularly, to a system and method for measuring sub-quarter micron dimensions in semiconductor devices. These dimensions are known as critical dimensions (cd).

2. Description of the Related Art

In semiconductor fabrication critical dimensions below 1 micron are typically measured with topdown scanning electron microscopy. Although a useful measurement tool, scanning electron microscopes have several disadvantages. These disadvantages include, among other things, charging a sample to be measured and increased risk of contamination.

Scanning electron microscopy (SEM) is used principally to provide images at or near the surface of a solid, such as a semiconductor chip. By scanning an electron beam across the surface of a specimen, a one-to-one correspondence can be set up in the positions of the probe upon the specimen and the electron beam on an imaging device, for example an oscillograph. The signal produced is brightness modulated to provide a visual image. As described, SEM requires the bombardment of the specimen with an electron beam. This charges the specimen and may cause damage to semiconductor devices. Further, the electron beam may produce mass transport of atoms on the specimen which may lead to contamination of various regions of the semiconductor device.

SEM and atomic force microscopy (AFM) are also limited, in that, these techniques primarily measure individual structures on the surface of a semiconductor device rather than structure assemblies.

Therefore, a need exists for a method and system with improved resolution for sub-quarter micron measurements. A further need exists for a method and system for making such measurements without charging on contaminating a sample being measured. A still further need exists for performing such measurements on structure assemblies thus improving the statistical value of the measurement. For this, we suggest to equip a conventional micro-ellipsometer with a revolving stage realizing a new kind of measurement tool which we call an Anisotropy Micro-Ellipsometer (AME) (i.e., a revolving ellipsometer). As will be explained, such an AME allows the measure of critical dimensions (cd) of sub-micron structure assemblies with high resolution without any of the aforementioned drawbacks. Conventional ellipsometry is well known in the art, and offers the advantage of being non-destructive and non-invasive to a sample. Conventional ellipsometers are used to measure optical parameters of surfaces and thicknesses of films which cover surfaces. For this, measurements on stationary samples are performed.

SUMMARY OF THE INVENTION

Unlike conventional ellipsometry, the present invention employs ellipsometry, namely AME, to measure critical lateral dimensions (cd). In addition, the present invention modifies the conventional ellipsometry by rotating the sample (revolving ellipsometry).

The system for measuring critical dimensions of surface features having form birefringence in accordance with the present invention includes a radiation source for providing radiation incident on a surface having surface features. A radiation detecting device is provided for measuring characteristics of the incident radiation after being reflected from the surface features. A rotating stage rotates the surface such that incident light is directed at different angles due to the rotation of the rotating stage. A processor is included for processing the measured characteristics of the reflected light and correlating the characteristics to measure the surface features.

In alternate embodiments of the system, the measured characteristics of the reflected light may be correlated to surface features by a formula relation between a complex index of refraction of the light and dimensional feature size. The surface features may include features extending substantially parallel to the surface and/or thicknesses extending substantially perpendicular to the surface. The incident radiation may include linearly polarized light. The reflected radiation may include elliptically polarized light. The radiation source and detecting device preferably includes an conventional ellipsometer. The measured characteristics of the reflected light may be correlated to surface features by an empirical calibrated relationship between the characteristics of the reflected light and dimensional feature sizes. The surface features below a length of about 250 nanometers are preferably measurable.

A method for measuring critical dimensions of features having form birefringence, in accordance with the present invention includes the steps of providing a surface having surface features thereon, radiating the surface features with light having a first polarization, measuring a reflected polarization of light reflected from the surface features, rotating the surface features by rotating the surface to measure the reflected polarization of the reflected light at at least one new rotated position and correlating the reflected polarization to surface feature sizes.

In illustrative methods, the step of providing the surface may include the step of providing a semiconductor device having surface features thereon. The step of radiating the surface features with light having a first polarization may include the step of radiating the surface features with light having a linear polarization. The step of measuring a reflected polarization of light reflected from the surface features may include the step of measuring ellipsometric angles $\Delta$ and $\Psi$ of the light reflected. The step of rotating the surface features by rotating the surface to measure the reflected polarization of the reflected light at least one new rotated position may include the step of rotating the surface features by rotating the surface in small increments of about 20 degrees. The step of correlating the reflected polarization to surface feature sizes may include the step of providing a formula which correlates characteristics of the reflected light to surface feature sizes. The characteristics of the reflected light preferably include polarization angles. The step of correlating the reflected polarization to surface feature sizes may include the steps of providing calibration data for a surface feature pattern, correlating characteristics of the reflected light to the calibration data to establish characteristic curves for the surface feature pattern, and measuring surface feature sizes of the surface feature pattern by comparing reflected light characteristics with the characteristic curves. The step of correlating the reflected polarization to surface feature sizes may include the step of determining a dielectric tensor to correlate reflected light characteristics to surface feature sizes. The step of measuring lateral and vertical feature sizes may be included. The step of measuring feature sizes of less than about 250 nanometers may also be included.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein:

FIG. 2A is an illustration of an ellipsometric measurement on a sample without any features (i.e., homogeneous isotropic surface);

DETAILED DESCRIPTION OF PREFERRED EMBODIMENTS

Figure 1:
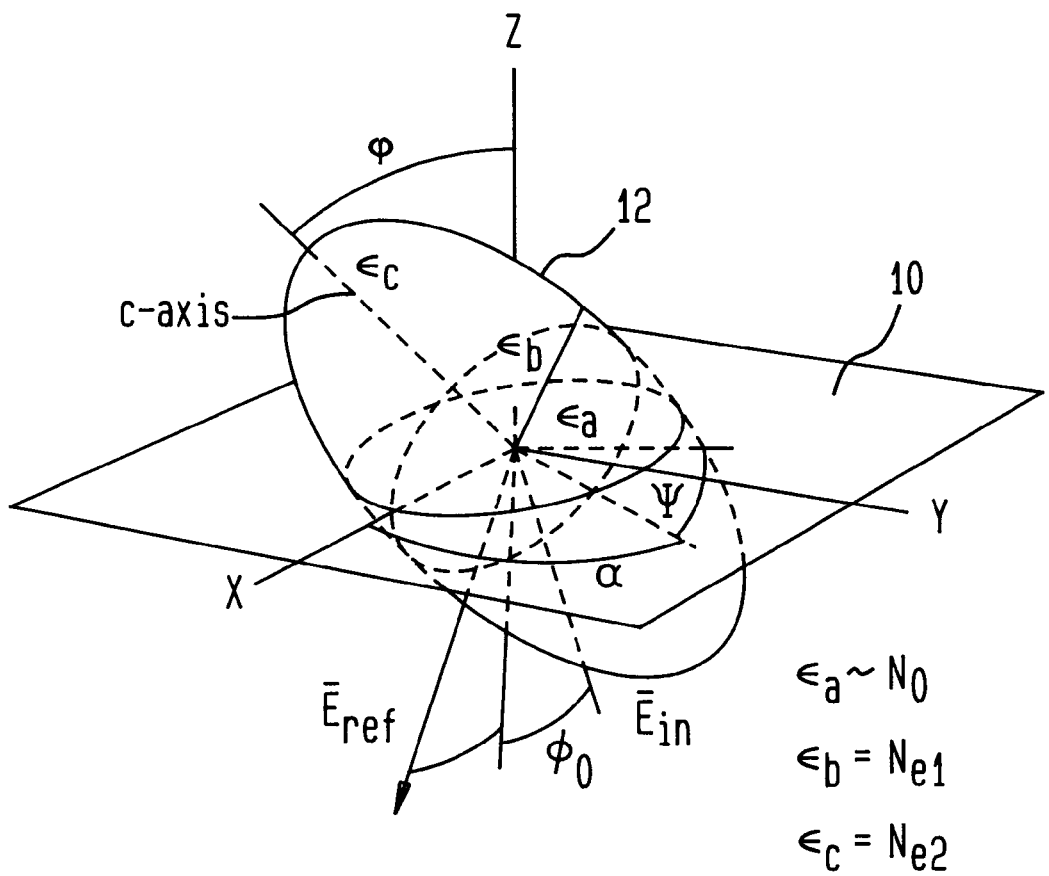
FIG. 1 is an illustration of the so called dielectric tensor and its orientation with respect to the sample surface and the ellipsometric plane of incidence.

This disclosure relates to measurement systems and methods and more particularly, to a system and method for measuring sub-quarter micron dimensions in semiconductor devices. The production of sub-micron microelectronic devices needs an accurate measurement technique for measuring lateral (critical dimensions (CD)) and vertical feature sizes (thicknesses) of designed structure on structure surfaces. The present invention employs form birefringence to measure features of structured surfaces, such as a semiconductor chip, with high resolution. A system and method are disclosed which permit for a simultaneous determination of both lateral and vertical feature sizes. The present invention further permits the measurement of an assembly of structures thus improving a statistical value of the measurement. An assembly size to be measured may be adjusted depending on a spot size of the light beam focused on the sample. The lateral resolution is in the order of about 1 nm.

In a case of an ordered arrangement of structures where the structures have a size which is large compared with molecular dimensions and small compared to the wavelength of light, an optical anisotropy results. This physical phenomenon is called form birefringence. The structures generated in sub-micron generations of current microelectronic devices fall into this regime. This means that the contact hole, trench or line structures generated with photolithography and etch techniques are optically anisotropic even if these structures include optically isotropic materials. This physical characteristic often disturbs, if not prevents, the use of conventional optical methods (e.g., ellipsometry, spectroscopy).

The present invention describes a new and novel method and system for optically measuring structures, preferably structures on semiconductor devices. The method of measurement of the present invention will be referred to generally as anisotropy micro-ellipsometry (AME). AME makes use of form birefringence and permits the determination of both lateral and vertical feature sizes. AME has all the advantages of ellipsometry including a non-invasive, highly sensitive measurement technique, yet can measure both lateral and vertical feature sizes. AME also provides a means to use and transfer vertical sensitivity of ellipsometry to the measurement of lateral dimensions simultaneously and in-situ, i.e., during fabrication or in between process steps without causing contamination or charging as with SEM.

Structures used in sub-micron generations of current semiconductor devices, for example in memory chips, show birefringence based on geometry rather than material properties. This translates to anisotropic optical systems when light is incident upon a surface of a sample to be measured. Optical properties of any anisotropic system are completely described by a 3×3 complex dielectric tensor. In its main axis system this tensor includes extraordinary complex refractive indices $N_{e1}$, $N_{e2}$ and an ordinary complex refractive index $N_0$ as its diagonal elements. The complex quantities N are defined as $N=n+ik$ where n is the conventional refractive index and k is an absorption coefficient (I is a unit complex number). For each particular structure, a quantitative correlation between the feature sizes of the structure and the optical parameters of the structure exist. For example, in the $$N_e^2 - N_o^2 = \frac{f_1 f_2 (N_1^2 - N_2^2)^2}{f_1 N_2^2 + f_2 N_1^2}$$

case of a line & space structure the relationship is given as: where $f_1=cd_1/(cd_1+cd_2)$, $f_2=cd_2/(cd_1+cd_2)$ with $cd_1$=line width (critical dimension) and $cd_2$=line spacing. $N_1$ is the complex refractive index of the line material (which is usually isotropic), $N_2$ is the complex refractive index of the space material (e.g., air=1). Any line & space structure is optically uniaxial. This causes the following relation to be true: $N_{e1}=N_{e2}=N_e$. From EQ. 1, it becomes clear that once the elements of the dielectric tensor are measured, the critical dimensions can be determined quantitatively. For more irregular structures or for other structures in general, a corresponding equation can be derived. Furthermore, critical dimensions may be determined by the calibration method described below. As is well known in the art, conventional ellipsometry is the most sensitive measurement technique for optical parameters. Ellipsometry measures the change of the state of polarization of a linearly polarized light beam reflected from a sample surface. After reflection, the light is elliptically polarized. Ellipsometry measures the state of polarization of elliptically polarized light by measuring two quantities, i.e., the angles $\Delta$, $\Psi$. As is well known, any ellipsis is completely determined by two quantities. Therefore, the state of polarization is completely determined by $\Delta$ and $\Psi$. Since two quantities are measured for each cycle, both the real and imaginary part of a complex refractive index can be determined with one measurement regarding isotropic systems.

Conventional ellipsometers can resolve 0.01 deg in $\Delta$ and $\Psi$. For a typical system, a layer thickness difference of 100 nm causes a $\Delta$-change of about 360 deg. Therefore, vertical feature size changes in the Å regime can be detected. With the same accuracy, the optical parameters can be determined. In its main axis system the dielectric tensor includes 3 complex numbers (6 parameters) namely $N_{e1}$, $N_{e2}$ and $N_0$. Consequently, determination of this tensor requires at least three independent ellipsometric measurements (three $\Delta$ and $\Psi$ pairs). This can be achieved by variation of Euler angles during the ellipsometric measurements. Referring now in specific detail to the drawings in which like reference numerals identify similar or identical elements throughout the several views, and referring initially to FIG. 1, the Euler angles $\alpha$, $\phi$, describe the orientation of the dielectric tensor with respect to a sample surface 10 and an ellipsometric plane of incidence 12. As mentioned above, the dielectric tensor contains the refractive indices $N_0$, $N_{e1}$, $N_{e2}$. The Euler angle $\alpha$ simple can be varied by rotation of the sample around its surface normal. Additionally, an azimuth angle of the polarizer of the used ellipsometer can be varied.

Figure 2B:
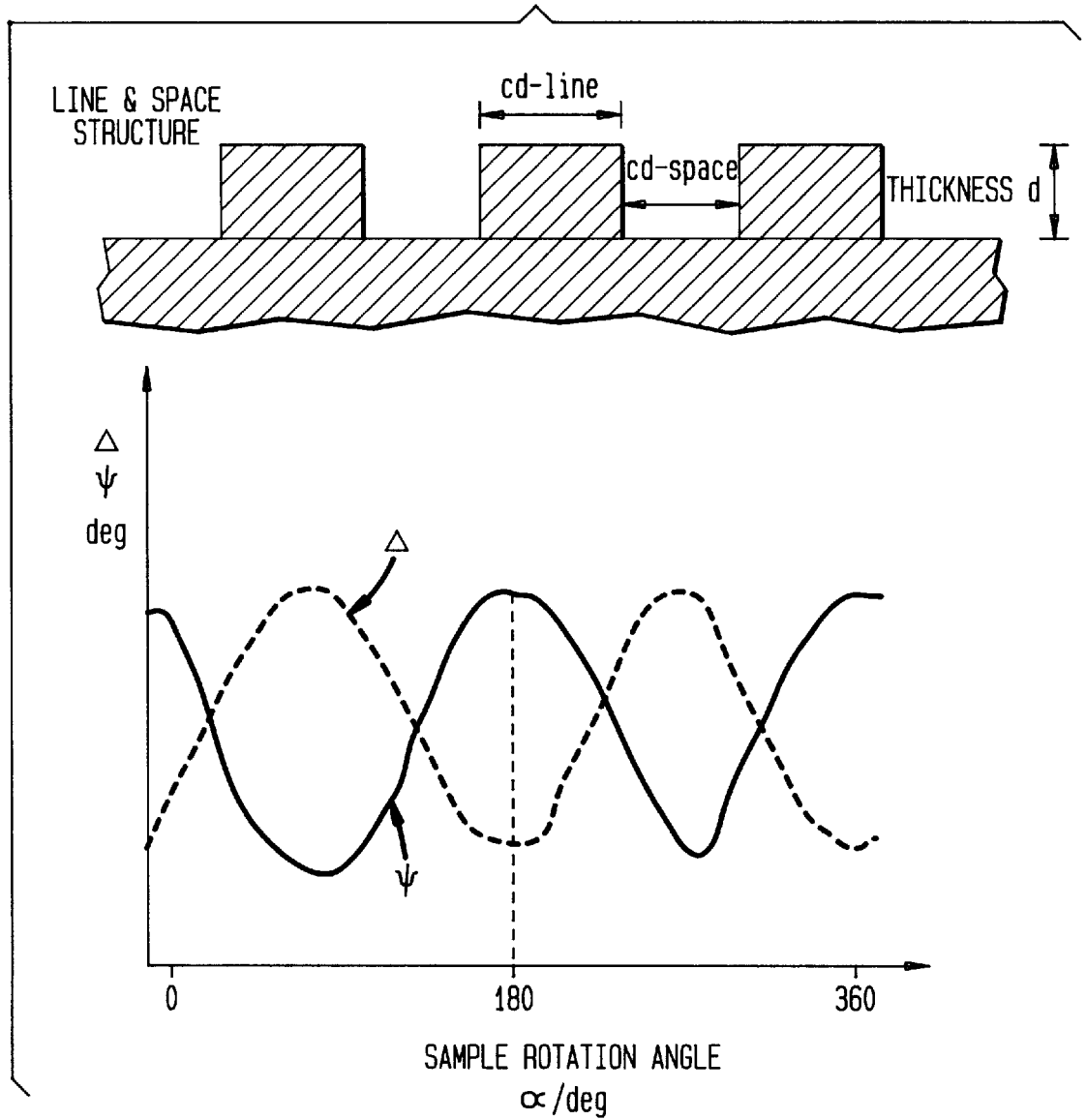
FIG. 2B is an illustration of an ellipsometric measurement of a line & space structure according to an embodiment of the present invention.
Figure 3:
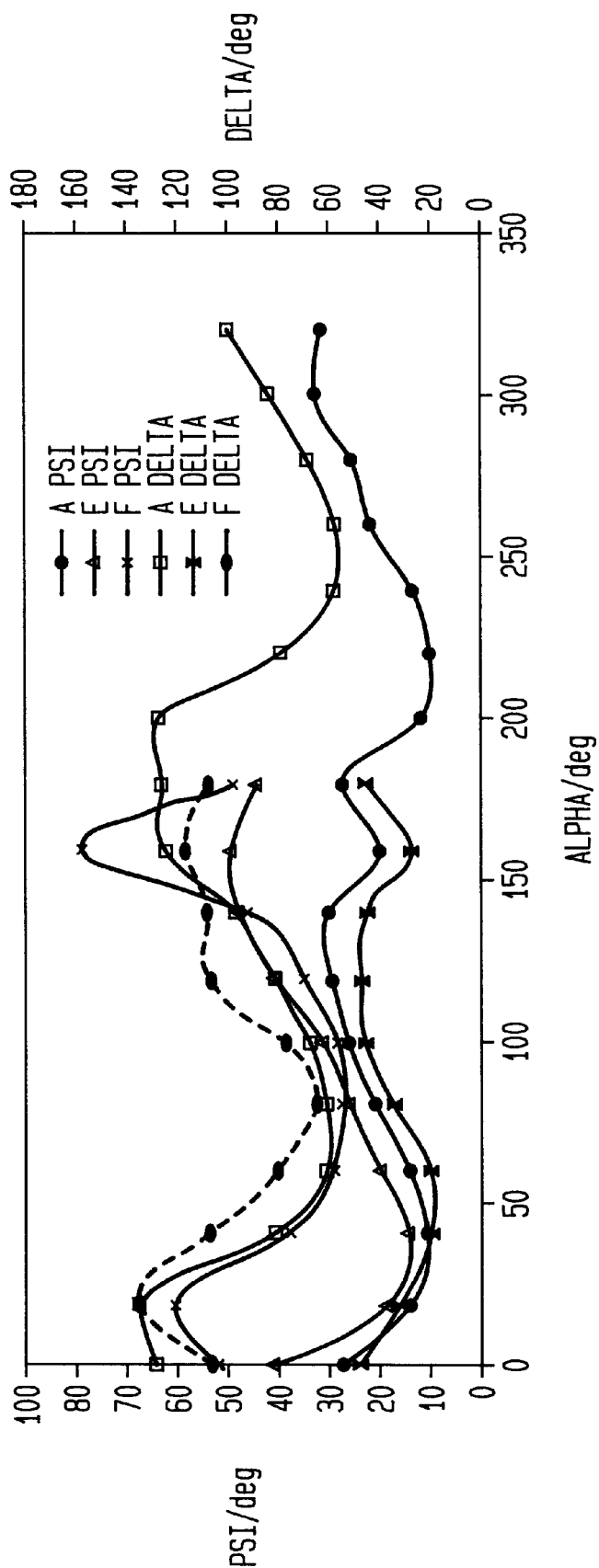
FIG. 3 is plot showing psi and delta measurements of line structures on three different chips as a function of alpha in accordance with the present invention.

Referring to FIGS. 1, 2 and 3, corresponding measurements of $\Delta$/deg (delta) and $\Psi$/deg (psi) as a function of sample rotation around a surface normal (angle $\alpha$) for two different samples are illustratively shown in FIG. 2.

In order to illustrate the principle of the disclosed AME method in comparison to conventional ellipsometry, FIG. 2A shows an ellipsometric measurement on a sample without any features (i.e., homogeneous isotropic surface). In this case, the ellipsometric measureable parameters $\Delta$ and $\Psi$ show no dependence on the sample rotation around the angle $\alpha$. This is the case of conventional ellipsometry. Consequently, in conventional ellipsometry, the sample is not rotated at all, and the measurement of $\Delta$ and $\Psi$ are performed at one fixed angle $\alpha$ only.

Oppositely, in case of line & space structure shown in FIG. 2B, a sinelike variation of $\Delta$ and $\Psi$ in dependence on the rotation angle $\alpha$ occurs. This is due to the form birefringence of this structure. This is the case of AME. The analysis of these $\Delta(\alpha)$ and $\Psi(\alpha)$ curves allows for a complete determination of the anisotropic optical parameters (i.e., the dielectric tensor) of the structure. These optical parameters (dielectric tensor) are correlated with the critical dimensions as is exemplified by equation 1. Therefore, the AME measurement of $\Delta(\alpha)$ and $\Psi(\alpha)$ curves of any structure showing form birefringence allows for the determination of its critical dimensions.

FIG. 3 shows such $\Delta(\alpha)$ and $\Psi(\alpha)$ curves for three different line & space structures (for example a gate conductor GC level in a memory chip having parallel lines in developed resist) with different cd's are illustratively shown in FIG. 3. The cd's for the different chips were: Chip F=224 nm, chip A=249 nm, chip E=280 nm, the pitch was constant in all cases (440 nm)). These chips and dimensions are examples only and used to demonstrate the capabilities of the present invention for comparison.

The measurements were performed applying a spectroscopic ellipsometer. The samples were rotated on a stage in 20 deg steps. This rotation is described by the angle $\alpha$. For all cd's a large variation of $\Delta$ and $\Psi$ as a function of $\alpha$ is observed. This variation covers a range of 100 deg in $\Delta$ and 30 deg in $\Psi$ which is extremely large if the ellipsometer resolution of 0.01 deg is considered.

Each of the shown $\Delta(\alpha)$ and $\Psi(\alpha)$ curves can be characterized by three quantities, namely the average value, the amplitude, and the phase. By a conventional fit procedure, as is well known in the art, for example a sum of the squares fit, the components of the dielectric tensor can be determined using these curves. For this, the generalized ellipsometry (GE) formalism which is well know in the art can be applied. See, e.g., "Thins Solid Films" 274 (1996) 82–94 by A. Michael is and J. W. Schultze for a detailed mathematical discussion, the entire contents of which are incorporated herein by reference. This tensor conversion may be implemented using one or more programmed processors. The processors may include software programs for implementing the conversion. This quantitative approach allows determination of the dielectric tensor. Subsequently, both lateral and vertical feature sizes (cd and thickness) can be derived using EQ. 1.

Depending on the geometry of the structures, an accuracy in the sub-nm-range can be estimated. Alternately, without a quantitative determination of the dielectric tensor, the method of the present invention can be used if a calibration approach is taken. For this, the cd-values of a test structure are to be measured by means of any independent method (for example using SEM, AFM, etc.). Subsequently these values can be correlated with the corresponding amplitudes or/and the minimum maximum values of the $\Delta$ and $\Psi$ curves.

Figure 4:
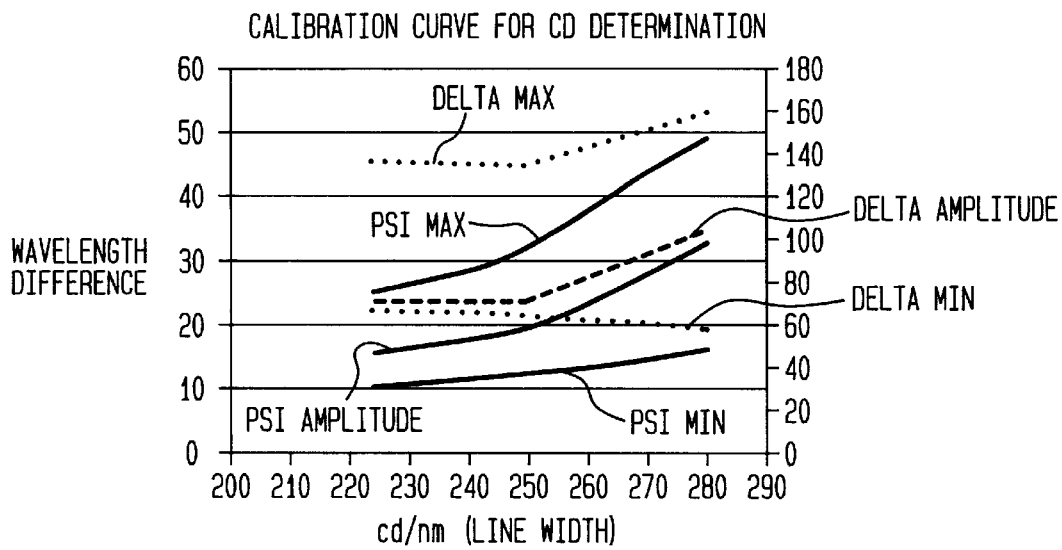
FIG. 4 is a critical dimension calibration curve in accordance with the present invention.
Figure 5:
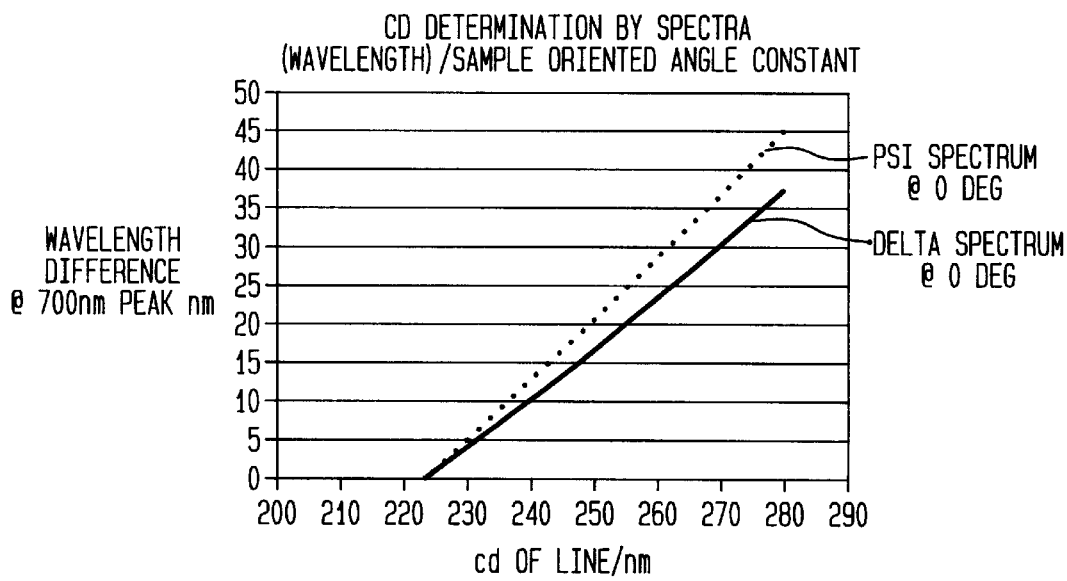
FIG. 5 is a spectra calibration curve in accordance with the present invention.

Referring to FIG. 4, illustrative calibration curves are shown for the above cited case of the GC-line structure of FIG. 3. From these curves a cd-resolution in the sub-nm regime can be estimated considering the ellipsometric resolution of 0.01 deg in delta ($\Delta$) and psi ($\Psi$). Alternatively, a calibration curve can be generated directly from the ellipsometric spectra. For this a characteristic peak in the $\Delta$ and $\Psi$ spectra has to be chosen. Subsequently, the wavelength shift of this peak can be determined by the dependence on the cd-change. A corresponding curve is generated and shown in FIG. 5. The resolution of this approach may be slightly lower due to limited wavelength resolution of spectroscopic measuring devices. The original spectra for the illustrative example shown in the above FIGS. are shown in FIG. 6 and FIG. 7.

Figure 8:
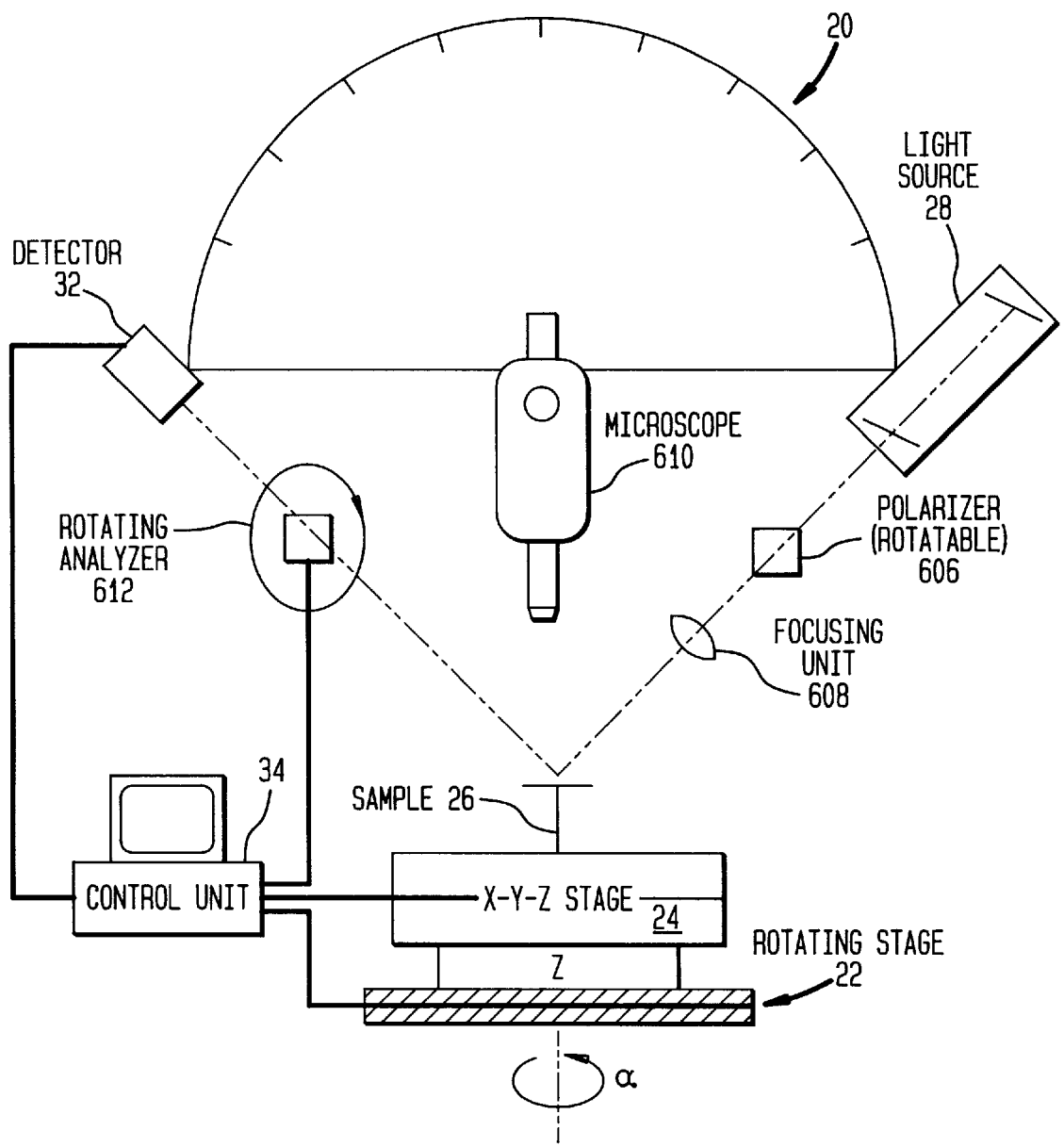
FIG. 8 is a schematic diagram of a system for measurement in accordance with the present invention.

Referring to FIG. 8, an apparatus 20 for measuring internal film stress on a sample 26 at high lateral resolutions is shown. The apparatus 20 comprises an ellipsometer and a rotating stage 22. The rotating stage 22 is rotatably disposed below the ellipsometer for rotating the sample to vary the angle of rotation a around a center of rotation axis. The ellipsometer measures ellipsometric parameters $\Delta$ and $\Psi$ by directing a linearly polarized incident light onto a selected area of sample 26 to generate an elliptically polarized reflected light. The ellipsometer compares the linearly polarized incident light and said elliptically polarized reflected light to measure the ellipsometric $\Delta$ and $\Psi$ values. In contrast to conventional elllipsometers, apparatus 20 can measure ellipsometric parameter $\Delta(\alpha)$ and $\Psi(\alpha)$ curves as a function of sample rotating angle $\alpha$.

The ellipsometer comprises a light source 28 (e.g., a laser beam, monochromator, polychroinator, diode detector array, etc.), a polarizer 606, a focusing unit 608, an x-y-z stage 24, a microscope 610, a rotating analyzer 612, a detector 32, and a control unit 34. Light source 28 generates an incident light such as a laser beam, a light beam, or any type of light. In particular, a light source which can be tuned in wavelength can be used to implement a spectroscopic method. Polarizer 606 receives the incident light and linearly polarizes it. Focusing unit 608, such as a lens, receives the light and focuses the linearly polarized light to provide and resolve high lateral resolutions on the surface of sample 26. Sample 26 is disposed on x-y-z stage 24, which changes the position of sample 26 in x, y and z directions. Microscope 610 is aligned to the center of rotation of the rotating stage 22 for selecting an area of sample 26 to determine critical dimensions.

Figure 6:
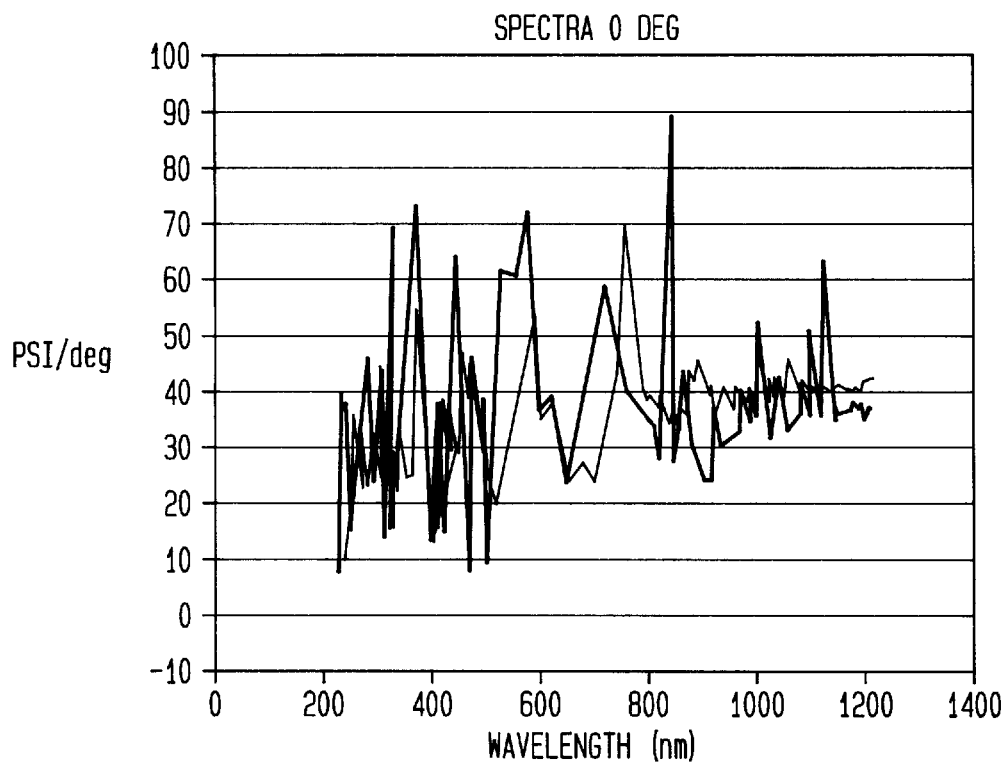
FIGS. 6 and 7 are ellipsometric spectra of psi and delta, respectively, taken on the structures of FIGS. 2A and 2B, showing peaks at around 700 nm which were used to generate the calibration curve in FIG. 5.
Figure 7:
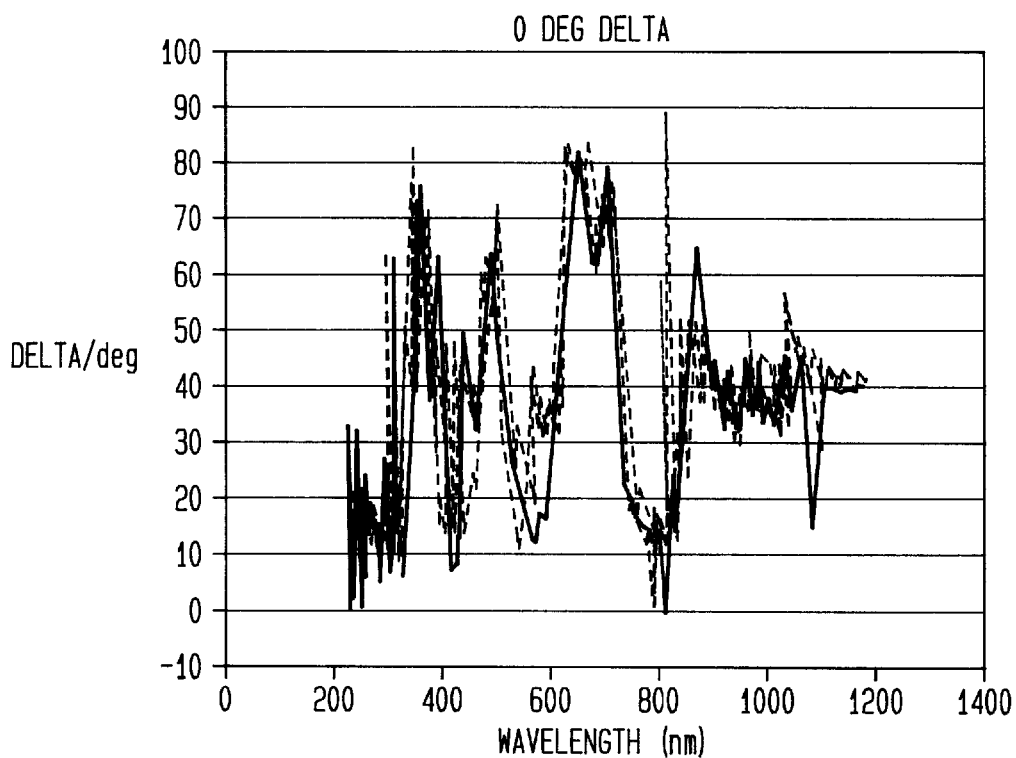

With reference to FIG. 6, the focused and linearly polarized incident light is directed to the selected area of sample 26 and is then reflected off sample 26 to generate elliptically polarized reflected light. Rotating analyzer 612 receives the elliptically polarized reflected light and transforms the polarization state to an intensity change. Analysis of this intensity signal allows determination of ellipsometric parameters $\Delta$ and $\Psi$. Detector 32 receives the reflected light through rotating analyzer and detects the light intensities to generate ellipsometric parameters $\Delta$ and $\Psi$ in terms of light intensity. Control unit 34 is coupled to detector 32, rotating analyzer 612, x-y-z stage 24, and rotating stage 22 for coordinating these units. Control unit or CPU 34 receives and correlates the ellipsometric parameters $\Delta$ and $\Psi$ from detector 32 to the angle of rotation, $\alpha$, to determine critical dimensions (cd) at the selected area of sample 26. This configuration allows selection of an arbitrary position on sample 26 (i.e., mapping) and to rotate it without affecting the elllipsometric alignment. In addition, the angle of incidence and the polarizer angle are adjustable. By thus rotating the sample under the ellipsometer, apparatus 20 allows measurement of ellipsometric parameters $\Delta$ and $\Psi$, and ellipsometric parameter curves $\Delta(\alpha)$ and $\Psi(\alpha)$ for determining critical dimensions on sample 26 by using the techniques described above.

Figure 9:
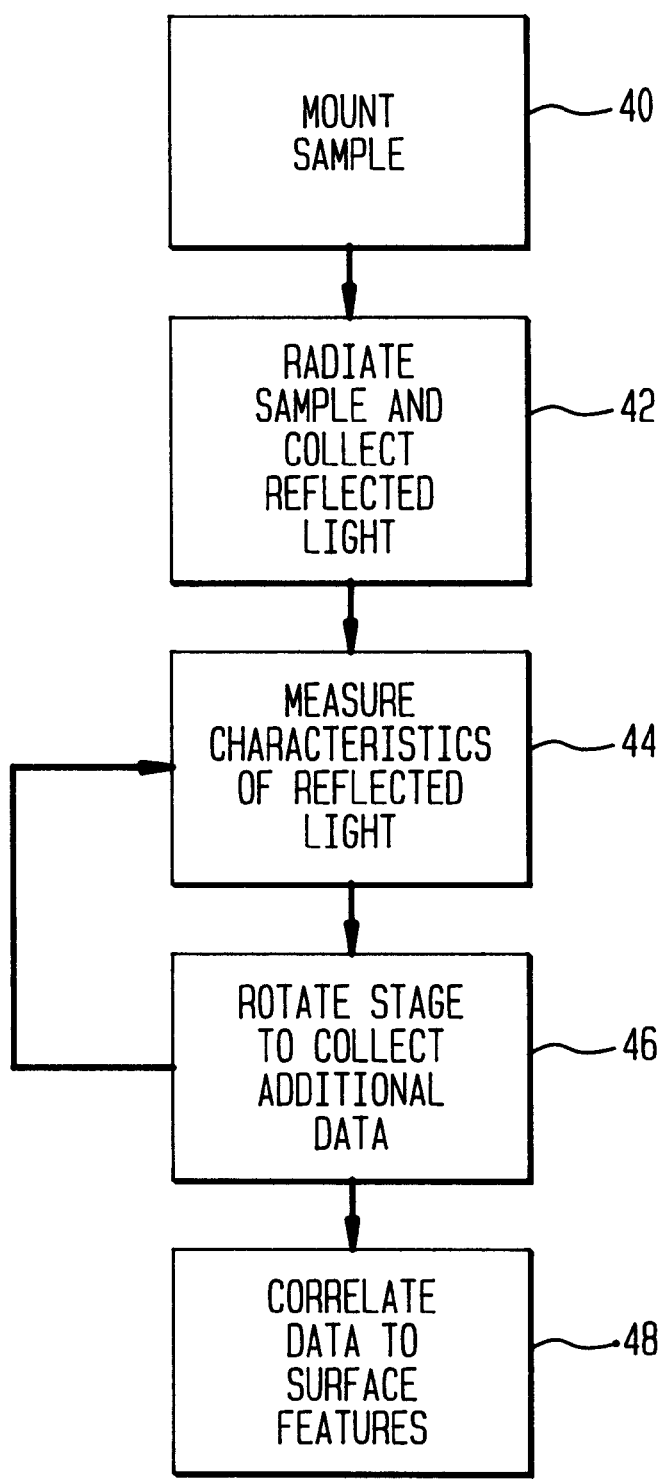
FIG. 9 is a flow diagram showing the steps for measuring vertical and lateral dimensions in accordance with the present invention.

Referring to FIG. 9, a method for measuring lateral and vertical surface features on a sample includes the following steps. In block 40, a sample is mounted on a rotating or revolving stage. In block 42, radiation is provided incident on the sample and is reflected therefrom preferably by an ellipsometer. In block 44, the reflected light is measured and the characteristics are recorded. In block 46, the stage is further rotated a predetermined amount and additional data is taken. This process is repeated until enough data is accumulated to determine the dielectric tensor or to characterize the data and correlate the data to surface features in block 48 using equation 1.

Figure 10:
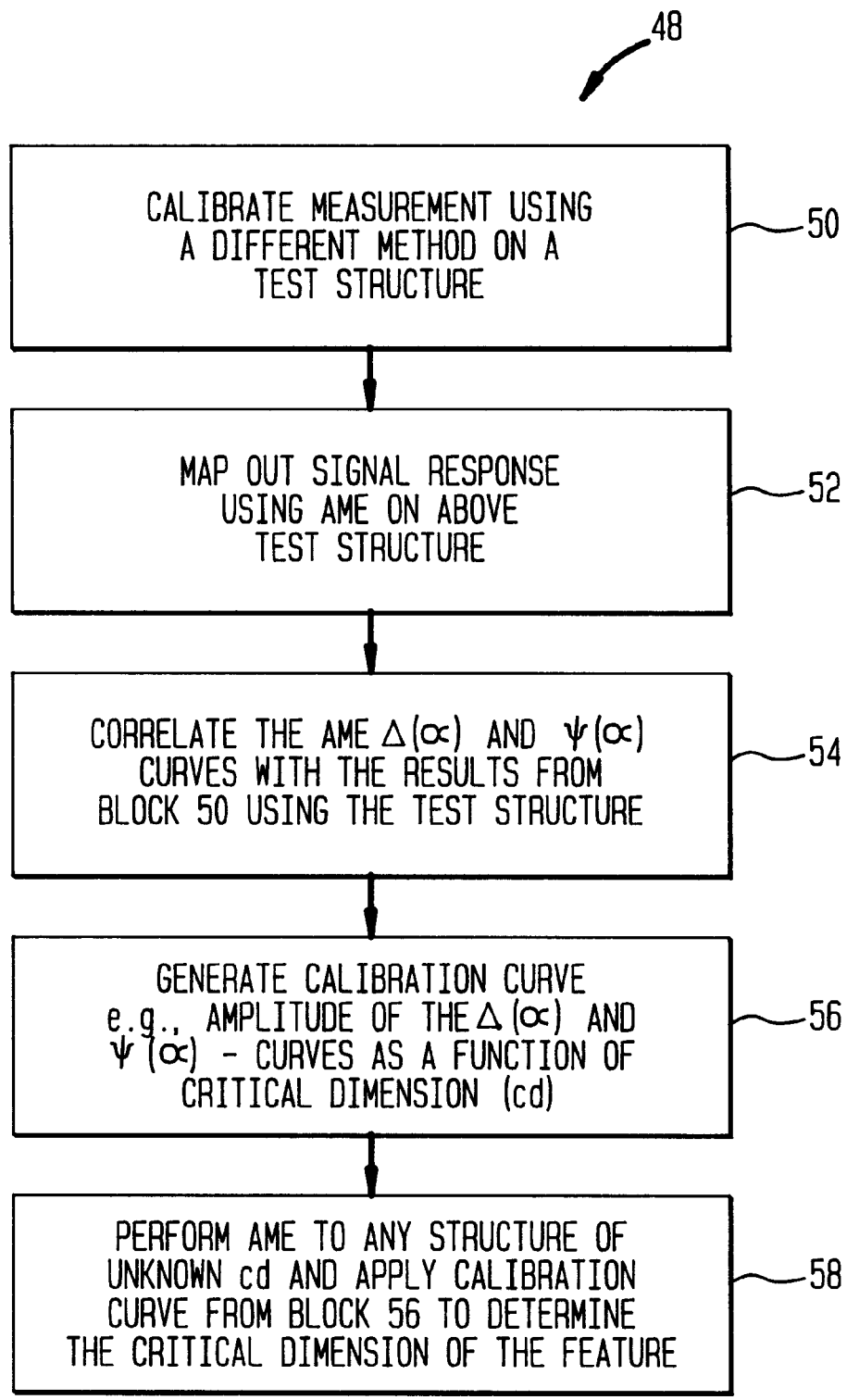
FIG. 10 is a flow diagram showing the alternate steps for correlating measurements to surface features in accordance with the present invention.

Referring to FIG. 10, in an alternate method, block 48 may include the following steps. A block 50 includes a calibration step wherein data is collected by a different measurement technique, for example AFM or SEM on a test structure. The surface features are mapped out and the signal response is recorded for reflected light using AME in block 52 on the same test structure. In block 54, the AME $\Delta(\alpha)$ and $\Psi(\alpha)$ curves, especially the amplitude and average values of these curves, are compared to the surface feature data collected by the different measurement technique. In this way, signal response provided by AME may be correlated to the actual measurements of features sizes and a calibration curve is generated in block 56.

Thereafter in block 58, AME is applied on any structure of unknown cd and the calibration curve is used for cd determination. Note, the calibration only needs to be done once on a test structure. Thereafter, any similar structure can be measured. Ellipsometry is already well established in production lines and the present invention is based upon conventional ellipsometry. Any ellipsometer with a microspot option can be used if a revolving stage is added. However, the alignment as well as the data acquisition procedure must be modified. For quantitative data analysis, completely software may be developed to process the data. The method can be applied on-line at high local resolution and it is non-invasive.

Having described preferred embodiments for a novel system and method for measuring lateral and vertical surface features in the sub-quarter micron regime (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A system for measuring surface features having form birefringence comprising:
    a radiation source for providing radiation incident on a surface having surface features;
    a radiation detecting device for measuring characteristics of the incident radiation after being reflected from the surface features;
    a rotating stage for rotating the surface such that incident radiation is directed at different angles due to the rotation of the rotating stage; and
    a processor for processing the measured characteristics of the reflected light and correlating the characteristics to measure the surface features.

2. The system as recited in claim 1, wherein the measured characteristics of the reflected light are correlated to surface features by a formula relation between a complex index of refraction of the light and dimensional feature size.

3. The system as recited in claim 1, wherein the surface features include features extending substantially parallel to the surface.

4. The system as recited in claim 1, wherein the surface features include thicknesses extending substantially perpendicular to the surface.

5. The system as recited in claim 1, wherein the incident radiation includes linearly polarized light.

6. The system as recited in claim 1, wherein the reflected light includes elliptically polarized light.

7. The system as recited in claim 1, wherein the radiation source and the radiation detecting device includes an ellipsometer.

8. The system as recited in claim 1, wherein the measured characteristics of the reflected light are correlated to surface features by an empirical calibrated relationship between the characteristics of the reflected light and dimensional feature sizes.

9. The system as recited in claim 1, wherein the surface features below a length of about 250 nanometers are measurable.

10. A method for measuring feature sizes having form birefringence comprising the steps of:
    providing a surface having surface features thereon;
    radiating the surface features with light having a first polarization;
    measuring a reflected polarization of light reflected from the surface features;
    rotating the surface features by rotating the surface to measure the reflected polarization of the reflected light at least one new rotated position; and
    correlating the reflected polarization to surface feature sizes.

11. The method as recited in claim 10, wherein the step of providing the surface comprises the step of providing a semiconductor device having surface features thereon.

12. The method as recited in claim 10, wherein the first polarization is a linear polarization.

13. The method as recited in claim 10, wherein the step of measuring a reflected polarization of light reflected from the surface features further comprises the step of measuring ellipsometric angles of the light reflected.

14. The method as recited in claim 10, wherein the step of rotating the surface further comprises the step of rotating the surface features by rotating the surface in increments of about 20 degrees.

15. The method as recited in claim 10, wherein the step of correlating the reflected polarization to surface feature sizes further comprises the step of providing a formula which correlates characteristics of the reflected light to surface feature sizes.

16. The method as recited in claim 15, wherein the characteristics of the reflected light include polarization angles.

17. The method as recited in claim 10, wherein the step of correlating the reflected polarization to surface feature sizes further comprises the steps of:

providing calibration data for a surface feature pattern;
correlating characteristics of the reflected light to the calibration data to establish characteristic curves for the surface feature pattern; and
measuring surface feature sizes of the surface feature pattern by comparing reflected light characteristics with the characteristic curves.

18. The method as recited in claim 10, wherein the step of correlating the reflected polarization to surface feature sizes further comprises the step of developing a dielectric tensor to correlate reflected light characteristics to surface feature sizes.

19. The method as recited in claim 10, further comprising the step of measuring lateral and vertical feature sizes.

20. The method as recited in claim 10, further comprising the step of measuring feature sizes of less than 250 nanometers.

21. An apparatus for measuring critical dimensions on an anisotropic sample at a high lateral resolution, said anisotropic sample showing form birefringence, said apparatus comprising:

an ellipsometer for measuring ellipsometric parameters $\Delta$ and $\Psi$, said ellipsometer directing a linearly polarized incident light onto a selected area of the sample to generate an elliptically polarized reflected light, said ellipsometer comparing said linearly polarized incident light and said elliptically polarized reflected light to measure said ellipsometric parameters $\Delta$ and $\Psi$; and a rotating stage rotatably disposed below said ellipsometer for rotating said sample so as to vary an angle of rotation $\alpha$ about a center of rotation axis, said center of rotation axis being aligned with said ellipsometer wherein said ellipsometer correlates said ellipsometric parameters $\Delta$ and $\Psi$ to said angle of rotation $\alpha$ to determine the critical dimension at said selected area of the sample at a high lateral resolution.

22. The apparatus as claimed in claim 21, wherein said ellipsometer further comprises:

a light source for generating light;

a polarizer for polarizing said light into said linearly polarized light;

a focusing unit for focusing said linearly polarized to resolve high lateral resolution;

an x-y-z stage for changing the position of said sample in x, y, and z directions, said sample being disposed over said x, y, and z stage wherein said linearly polarized light reflects off of said sample to generate said elliptically polarized reflected light;

a microscope aligned to said center of rotation of said rotation stage for selecting an area of said sample to determine critical dimensions thereon;

a rotating analyzer for comparing said first polarization state to said second polarization state to generating said ellipsometric parameters $\Delta$ and $\Psi$ in terms of the polarization state, said rotating analyzer for transforming said $\Delta$ and $\Psi$ angles into a light intensity;

a detector for detecting said light intensity to generate elllipsometer parameters $\Delta$ and $\Psi$; and a control unit coupled to said detector, said rotating analyzer, said x-y-z stage and said rotating stage for measuring and correlating the ellipsometric parameters $\Delta$ and $\Psi$ from said detector to the angle of rotation, $\alpha$, to determine critical dimension at said selected area of said sample.

23. The apparatus as claimed in claim 22, wherein said light source is a laser beam.

24. The apparatus as claimed in claim 22, wherein said light source further comprises a polychromator.

25. The apparatus as claimed in claim 24, wherein said light source further comprises a diode-detector array.

26. The apparatus as claimed in claim 22, wherein said focusing unit comprises a lens system.

27. The apparatus as claimed in claim 22, wherein said focusing unit is a microscope objective.

28. The apparatus as claimed in claim 22, wherein the sample is an integrated circuit device.

29. The method as claimed in claim 21, wherein the second ellipsometric parameters are measured at the high lateral resolution by focusing a linearly polarized incident light onto the selected area of the sample to generate and elliptically polarized reflected light and then measuring the second ellipsometric parameters of the elliptically polarized reflected light.

30. The method as claimed in claim 21, wherein said sample is an integrated circuit device showing form birefringence.

31. A method for determining critical dimensions in a sample at high lateral resolution, said sample comprising at least one material and having surface features having form birefringence, said method comprising the steps of:

generating a calibration curve correlating a set of first ellipsometric amplitudes to a set of first critical dimension values, one first critical dimension value for each first ellipsometric amplitude;

measuring a second ellipsometric parameter over a range of rotation angle $\alpha$ at a selected area of the sample by rotating the sample to determine a second ellipsometric amplitude; and determining the critical dimension at the selected area of the sample from the calibration curve by using the second ellipsometric amplitude as an index to determine a corresponding first critical dimension value from the calibration curve.

32. The method as claimed in claim 31, wherein said step of generating the calibration curve is performed from at least one test sample, the test sample comprising at least on material having form birefringence, and characterized by at least one first critical dimension value.

33. The method as claimed in claim 32, wherein the calibration curve generating step further comprises the steps of:

measuring the set of first critical dimension values in said at least on test sample having form birefringence;

measuring, for each first critical dimension value, a first ellipsometric parameter over the range of the rotation angle a by rotating said at least one test sample to generate a set of first ellipsometric parameter values;

determining, for each set of the first ellipsometric parameter values, the first ellipsometric amplitude representing the difference between a first maximum and a first minimum values defined by the set of first ellipsometric parameter values; and correlating the first ellipsometric amplitudes to the first critical dimension values to generate the calibration curve.

34. The method as claimed in claim 33, further comprising the step of generating a second set of ellipsometric parameter values from the second ellipsometric parameter measured over the range of the rotation angle $\alpha$ of the sample.

35. The method as claimed in claims 34, wherein the set of second ellipsometric parameter values defines a second ellipsometric parameter curve, wherein a second ellipsometric amplitude is the difference between a second maximum and a second minimum values in the second ellipsometric parameter curve.

36. The method as claimed in claim 34, further comprising the step of defining a second ellipsometric amplitude as the difference between a second maximum and a second minimum values defined by the set of second ellipsometric parameter values.

37. The method as claimed in claim 33, wherein the first ellipsometric parameter and the second ellipsometric parameter are both $\alpha$.

38. The method as claimed in claim 33, wherein the first ellipsometric parameter and the second ellipsometric parameter are both $\Psi$.

39. The method as claimed in claim 33, wherein the first ellipsometric parameter and the second ellipsometric parameter are measured over the rotation angle $\alpha$.

40. The method as claimed in claim 37, wherein the first ellipsometric parameter $\Delta$ and the first ellipsometric parameter $\Psi$ are measured as a function of the rotation angle $\alpha$ to generate the set of first ellipsometric parameter values $\Delta(\alpha)$.

41. The method as claimed in claim 38, wherein the first and second ellipsometric parameter $\Psi$ is measured as the function of the portion of the rotation angle $\alpha$ to generate the set of first ellipsometric parameter values $\Psi(\alpha)$.

42. The method as claimed in claim 36, wherein both the first ellipsometric parameter and the second ellipsometric parameter further comprise an ellipsometric parameter $\Delta$ and an ellipsometric parameter $\Psi$.

43. The method as claimed in claim 42, wherein the calibration curve further comprises a first calibration curve and a second calibration curve.

44. The method as claimed in claim 43, wherein the first calibration curve is generated for the first ellipsometric parameter $\Delta$ and the second calibration curve is generated for the first ellipsometric parameter $\Psi$.

45. The method as claimed in claim 42, wherein the ellipsometric parameters $\Delta$ and $\Psi$ are measured over the rotation angle $\alpha$.

46. The method as claimed in claim 42, wherein the ellipsometric parameters $\Delta$ and $\Psi$ are measured over the rotation angle $\alpha$ to generate the set of first and second ellipsometric parameter values $\Delta(\alpha)$ and $\Psi(\alpha)$, respectively.

47. The method as claimed in claim 43, wherein the second amplitude further comprises $\Delta(\alpha)$ amplitude and $\Psi(\alpha)$ amplitude.

48. The method as claimed in claim 46, wherein $\Delta(\alpha)$ amplitude and $\Psi(\alpha)$ amplitude of the second amplitude are used as an index to the first calibration curve and the second calibration curve respectively, to determine the corresponding critical dimension values.

49. The method as claimed in claim 48, wherein the critical dimension values corresponding to $\Delta(\alpha)$ amplitude and $\Psi(\alpha)$ amplitude are averaged to determine the critical dimension of the structure having form birefringence.

* * * * *